(12) United States Patent
Sato

(10) Patent No.: US 7,798,529 B2
(45) Date of Patent: Sep. 21, 2010

(54) SEAT SUPPORT STRUCTURE

(75) Inventor: Masatoshi Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/200,300

(22) Filed: Aug. 28, 2008

(65) Prior Publication Data

US 2009/0058124 A1   Mar. 5, 2009

(51) Int. Cl.
*B60P 3/22* (2006.01)
(52) U.S. Cl. .................. 280/834; 280/304.3; 280/770; 280/835; 180/219
(58) Field of Classification Search ................ 280/834, 280/304.3, 835, 770, 219
See application file for complete search history.

(56) References Cited

U.S. PATENT DOCUMENTS 6,341,792 B1 * 1/2002 Okuma .................... 280/304.3
7,475,749 B2 * 1/2009 Yoshida et al. ............. 180/68.1
2006/0175112 A1 * 8/2006 Yoshida et al. ............. 180/229
2007/0257535 A1 * 11/2007 Yasuda et al. ............... 297/311

FOREIGN PATENT DOCUMENTS

JP          60-222377 A      11/1985

* cited by examiner

*Primary Examiner*—Lesley Morris
*Assistant Examiner*—Tashiana Adams
(74) *Attorney, Agent, or Firm*—Birch, Stewart Kolasch, & Birch LLP

(57) ABSTRACT

A seat support structure for restricting the movement of a seat front end and facilitate the mounting of the seat, the seat support structure including a tank cover provided for a fuel tank supported by a body frame, a flange extending to the rear of a vehicle body and provided on the rear portion of the tank cover and a fastening groove which opens upward to fasten the flange thereto, the fastening groove being provided at the front portion of a seat located to the rear of the tank cover and of the fuel tank.

11 Claims, 14 Drawing Sheets

SEAT SUPPORT STRUCTURE

CROSS-REFERENCE TO RELATED APPLICATIONS

The present application claims priority under 35 USC 119 to Japanese Patent Application No. 2007-226533 filed on Aug. 31, 2007 the entire contents of which are hereby incorporated by reference.

BACKGROUND OF THE INVENTION

1. Field of the Invention

The present invention relates to a seat support structure for a vehicle in which a fuel tank is supported by a body frame, a tank cover is provided for the fuel tank and the tank cover is fastened to a seat located rearward of the fuel tank.

2. Description of Background Art

A vehicle is known wherein a fuel tank is supported by a body frame with hooks being provided on the sides of the fuel tank. The hooks are engaged with a bottom plate of a seat which is supported by the body frame at a position rearward of the fuel tank. See, Japanese Patent Laid-open No. Sho 60-222377.

In the existing configuration described above, the bottom plate of the seat is recessed in a boxlike manner and a boxlike portion is provided with an opening. A hook provided on the vehicle body side is inserted into the opening and engaged with a wall around the opening to restrict the lateral movement of the front end of the seat. It is necessary, therefore, to insert the hook into the accurate position. However, when the seat is mounted, the hook and the hook-inserted opening are hidden from the seat to be invisible from the outside. This makes it difficult to insert the hook into the opening, thus, to mount the seat.

SUMMARY AND OBJECTS OF THE INVENTION

Accordingly, it is an object of an embodiment of the present invention to solve the problem of the existing technique mentioned above and to provide a seat support structure that can restrict the movement of a seat front end for facilitating the mounting of a seat.

According to an embodiment of the present invention, a seat support structure for a vehicle is provided in which a fuel tank is supported by a body frame with a tank cover being provided for the fuel tank. A seat is located rearward of the fuel tank and is fastened to the tank cover. The tank cover is provided at a rear portion with a flange which extends toward the rear of a vehicle body. In addition, the seat is provided with a fastening groove which opens upward to be fastened to the flange.

According to an embodiment of the present invention, the tank cover is provided at the rear portion with the flange which extends toward the rear of the vehicle body with the seat being provided with the fastening groove which opens upward to be fastened to the flange. Thus, the flange can be gripped by the fastening groove by being guided thereto through the opening, which can restrict the movement of the seat and facilitate the mounting of the seat.

In this case, preferably, the fastening groove is a generally U-shaped fastening groove which opens upward. With this configuration, since the fastening groove is a generally U-shaped fastening groove which opens upward, the flange can be gripped by the fastening groove by being guided thereto through the opening, which can restrict the movement of the seat and facilitate the mounting of the seat.

In this case, preferably, the fastening groove is provided inside a seat front end which extends to the left and the right. With this configuration, since the fastening groove is provided inside the seat front end which extends to the left and the right, the seat can easily be mounted with the fastening groove not exposed to the external appearance of the vehicle body and the fastening groove can integrally be provided on a seat bottom plate.

In this case, preferably, a leg of the fastening groove on the internal side of the vehicle body is slanted to enter toward the inside of the vehicle body with respect to the flange of the seat fastening portion. With this configuration, since the leg of the fastening groove on the internal side of the vehicle body is slanted to enter toward the inside of the vehicle body with respect to the flange of the seat fastening portion, this slant can smoothly guide the flange in the fastening groove, thereby facilitating the mounting of the seat.

According to an embodiment of the present invention, since the tank cover is provided at the rear portion with the flange which extends toward the rear of the vehicle body and the seat is provided at the front portion with the fastening groove which opens upward to be fastened to the flange, the flange can be gripped by the fastening groove by being guided thereto through the opening, which can restrict the movement of the seat and facilitate the mounting of the seat.

In addition, since the fastening groove is a generally U-shaped fastening groove which opens upward, the flange can be gripped by the fastening groove by being guided thereto through the opening, which can restrict the movement of the seat and facilitate the mounting of the seat.

In addition, since the fastening groove is provided inside the seat front end which extends to the left and the right, the seat can easily be mounted with the fastening groove not exposed to the external appearance of the vehicle body and the fastening groove can integrally be provided on a seat bottom plate.

In addition, since the leg of the fastening groove on the internal side of the vehicle body is slanted to enter toward the inside of the vehicle body with respect to the flange of the seat fastening portion, this slant can smoothly guide the flange in the fastening groove, thereby facilitating the mounting of the seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the accompanying drawings. It is to be noted that directions such as front, rear or back, left, right, up and down in the description are based on a vehicle body. In addition, arrows FR, R and UP indicate the front, right and upside, respectively, of the vehicle body.

Figure 1:
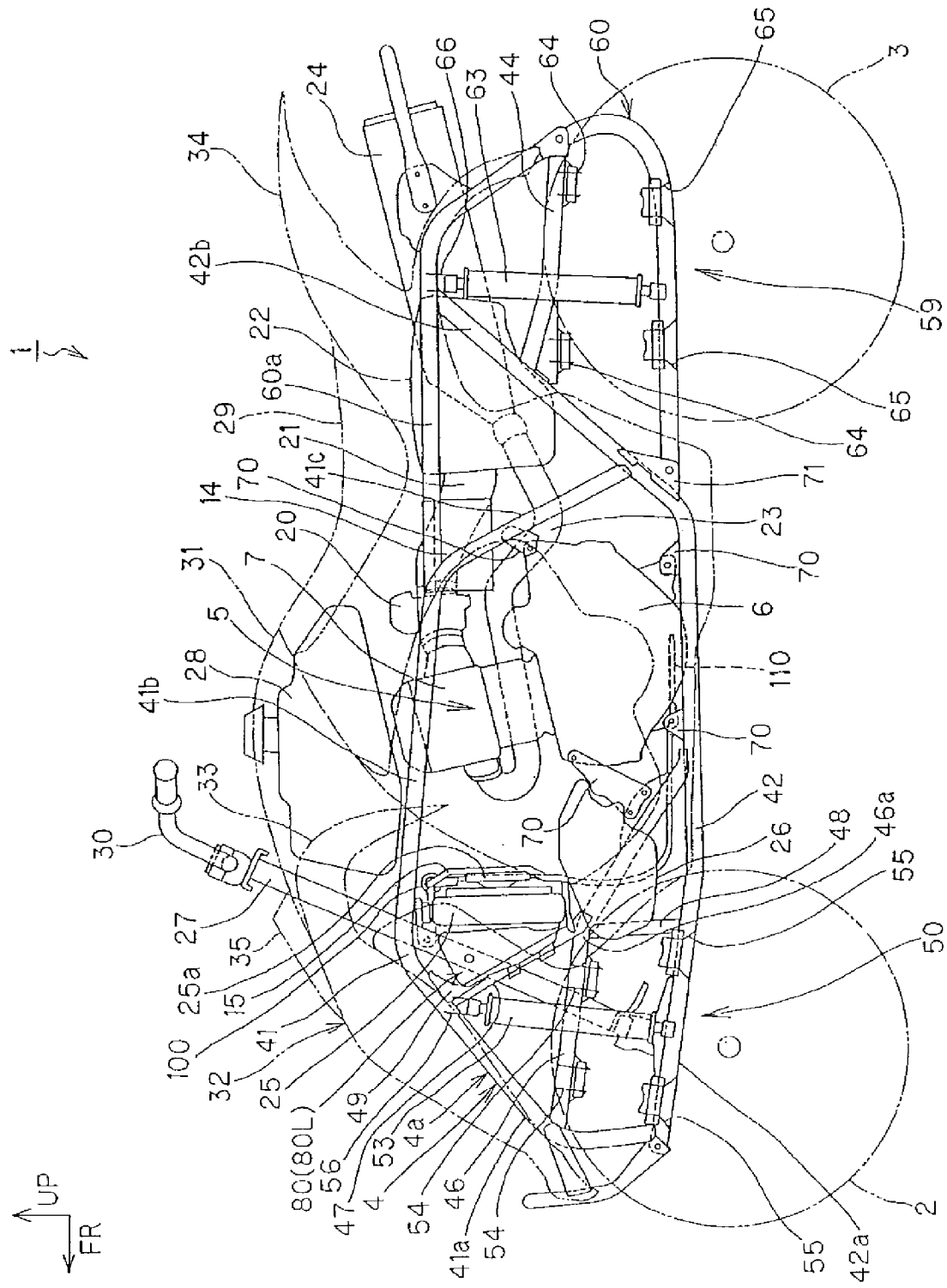
FIG. 1 is a lateral view of a saddle-ride type vehicle according to an embodiment of the present invention.
Figure 2:
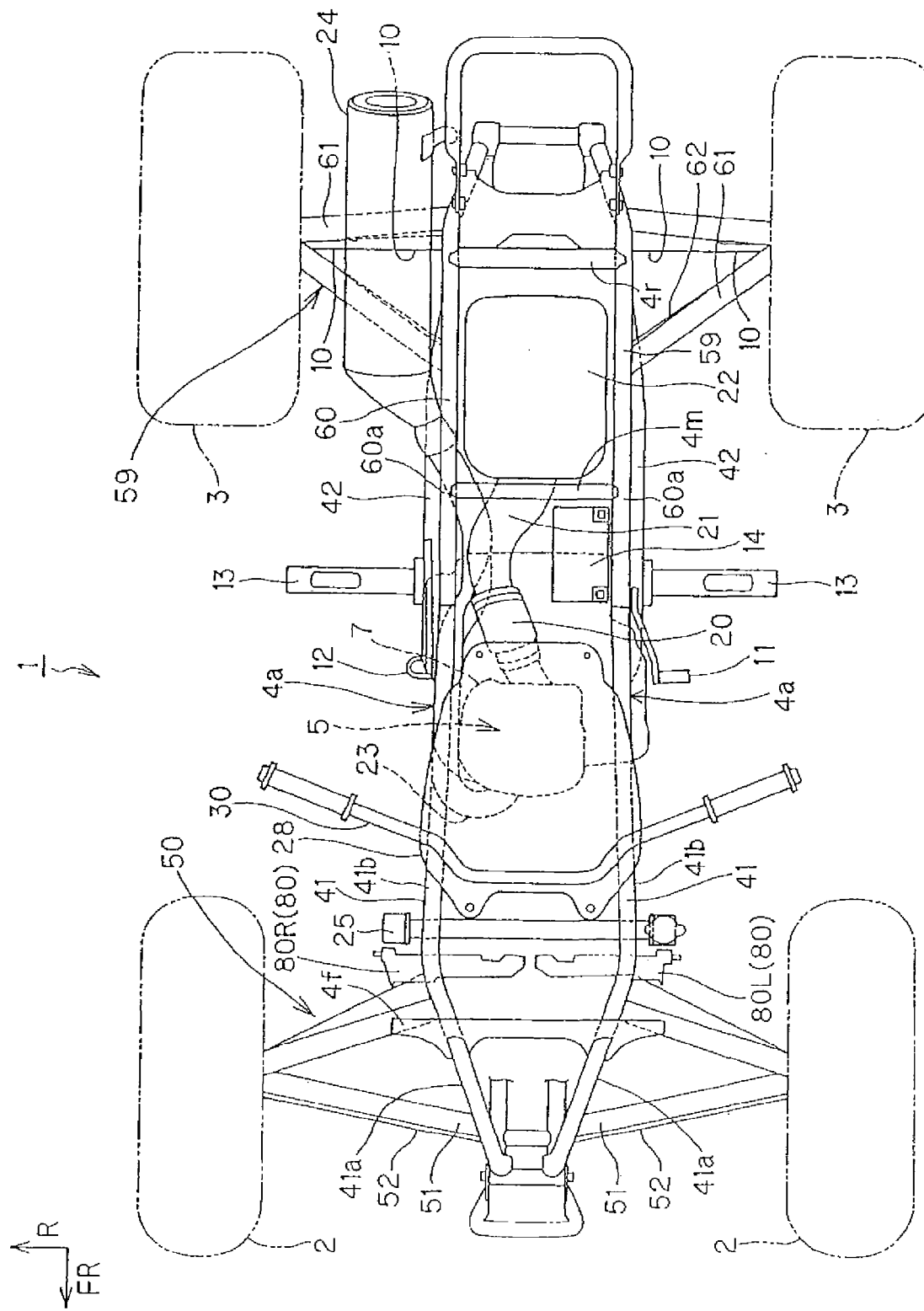
FIG. 2 is a plan view of the saddle-ride type vehicle.

FIG. 1 is a lateral view of a saddle-ride type vehicle according to an embodiment of the present invention and FIG. 2 is a plan view of FIG. 1. This saddle-ride type vehicle 1 is a four-wheeled vehicle classified into an ATV (All Terrain Vehicle). This vehicle is provided with left and right front wheels 2 and rear wheels 3 with a relatively large diameter at the front and rear, respectively, of the vehicle body which is constructed to be of a small-sized and lightweight. The vehicle thus constructed sufficiently ensures minimum ground clearance to enhance traveling performance on irregular ground.

Referring to FIG. 1, the saddle-ride type vehicle 1 has a body frame 4. The left and right front wheels 2 are suspended by a front suspension 50 at the front portion of the body frame 4. The left and right rear wheels 3 are suspended by a rear suspension 59 at the rear portion of the body frame 4.

An engine (water-cooled engine) 5 is mounted on a generally central portion of the body frame 4 via a plurality of engine mounts 70. A throttle body 20 is connected to the rear portion of a cylinder portion 7 of the engine 5. An air cleaner case 22 is connected to the rear portion of the throttle body 20 via a connecting tube 21. These components constitute an intake system for the engine 5. An exhaust pipe 23 is joined from the front to the cylinder portion 7 of the engine 5. As shown in FIG. 2, this exhaust pipe 23 extends forward of the cylinder portion 7, then bends to the right of the vehicle body, and turns backward. Then, the exhaust pipe 23 extends rearward on the right side of the cylinder portion 7 and is connected to a muffler 24 disposed at the rear portion of the vehicle body. These components constitute an exhaust system for the engine 5. As illustrated in FIG. 2, a gear shift pedal 11 is provided together with a brake pedal 12, foot rest steps 13, 13, and a battery 14.

As shown in FIGS. 1 and 2, a radiator 25 for cooling the engine is disposed forward of the engine 5. The radiator 25 is connected to the engine 5 via a rubber-made cooling water pipe to cool the cooling water supplied from the engine 5 by an air flow from the front of the vehicle and return the water to the engine 5. A blower fan 25a (FIG. 1) is disposed on the back of the radiator 25 and configured to allow external air to forcibly flow toward the radiator 25 to cool cooling water. A reservoir tank 26 (FIG. 1) for storing cooling water is disposed below (left below in the embodiment) and connected to the radiator 25 via a rubber-made cooling water pipe.

The engine 5 includes a crankcase journaling a crankshaft and the like and a cylinder portion 7 connected onto the crankcase 6. The crankcase 6 also serves as a transmission case for accommodating a transmission and has an output shaft connected to the transmission in the crankcase 6. Rotation of the output shaft is transmitted to a final gear case (not shown) in the rear portion of the body frame 4 via a chain transmission mechanism not shown. Thus, the rear wheels 3 are drivingly rotated via drive shafts 10 (FIG. 2) extending laterally from the final gear case.

As shown in FIG. 1, a steering shaft 27 for steering the front wheels 2, 2, a fuel tank 28 and a saddle-ride type seat 29 are arranged in this order from the front at the vehicle-widthwise central portion of the upper portion of the body frame 4. A handlebar 30 is attached to the upper end of the steering shaft 27 at a position obliquely upward of and forward of the fuel tank 28. A steering mechanism is connected to the lower end of the steering shaft 27. The front wheels 2, 2 are steered with the handlebar 30 via the steering mechanism.

The fuel tank 28 is disposed above the engine 5. The fuel in the fuel tank 28 is supplied via a fuel pump not shown to an injector (not shown) disposed in the throttle body 20 and is fed into the engine 5 by the injector.

The saddle-ride type seat 29 extends toward the front and rear of the vehicle body so that it is secured at a front end to a tank cover 31 and is secured to the tank cover 31 with the tank cover 31 covering the fuel tank 28 from above.

A resin-made body cover 32 which covers the vehicle body, a resin-made front fender 33 which covers both the front wheels 2 from above and from the rearward and a resin-made rear fender 34 which covers both the rear wheels 3 from the front and from above are attached to the body frame 4. The body cover 32 includes a top cover 35 which covers the front portion of the vehicle body and a pair of left and right side covers (not shown) which cover the front portion of the vehicle body from the left and from the right.

As shown in FIG. 2, the body frame 4 includes a pair of left and right main frames 4a, 4a extending in the approximately back and forth direction of the vehicle body and a pair of left and right sub-frames 60, 60 connected respectively to the rear portions of the main frames 4a, 4a. The main frames 4a, 4a are each formed by joining together a plurality of steel materials (cylindrical pipe frames (round pipe frames)) by welding or the like. A pair of left and right closed loop structures are mainly formed of left and right upper pipes 41, 41 and a pair of left and right lower pipes 42, 42. These structures are connected with each other via a plurality of cross members 4f, 4m, 4r to form a longitudinally elongate box structure in the vehicle-widthwise central portion.

As shown in FIGS. 1 and 2, the pair of left and right upper pipes 41, 41 each include a front slant portions 41a, an intermediate portion 41b, and a rear slant portion 41c. The front slant portions 41a, 41a each extend from the front end obliquely upwardly and then extend toward the rear of the vehicle body while their interval is gradually increased. The intermediate portions 41b, 41b each extend obliquely downward on a gentle slant from the rear end of the front slant portion 41a and extend toward the rear of the vehicle body with an almost constant interval therebetween. The rear slant portions 41c, 41c each extend obliquely downwardly on a sharper slant than the intermediate portion 41b from the rear end of the intermediate portion 41b and then extend toward the rearward of the vehicle body with an almost constant intervals therebetween. Each of the upper pipes is formed by bending a single steel pipe.

The pair of left and right sub-frames 60, 60 are each joined to a boundary between the intermediate portion 41b and rear slant portion 41c of the upper pipe 41. The sub-frames 60, 60 each extend to the back and approximately horizontally, bending downward at the rear of the vehicle body and bending to form a U-shape as viewed from the side, and are each joined at the leading end to a corresponding one of the pair of left and right lower pipes 42, 42.

Respective horizontal extensions 60a, 60a of the sub-frames 60, 60 also serve as seat rails. The above-mentioned cross members 4m, 4r are disposed at the extensions 60a, 60a to also serve as support members adapted to support the seat 29.

As shown in FIG. 1, the pair of left and right lower pipes 42, 42 each extend in the back and forth direction of the vehicle body below the upper pipe 41 and include a horizontal portion 42a and a rear slant portion 42b. The horizontal portions 42a, 42a each are connected with the front slant portion 41a of the upper pipe 41 and extend almost horizontally toward the rear of the vehicle body. The rear slant portions 42b, 42b each extend obliquely upwardly from the rear end of the horizontal portion 42a and are each connected at the rear end with the sub-frame 60. The low arms 42, 42 are each formed by a single steel pipe.

The pair of left and right sub-flames 60, 60 are each joined to a boundary between the horizontal portion 42a and rear slant portion 42b of the lower pipe 42 via brackets 71. A final gear case (not shown) for the rear wheels is supported between and by the sub-frames 60.

A pair of left and right rear sub-frames 44, 44 are each spanned between the sub-frame 60 and the rear slant portion 42b of the lower pipe 42. The rear sub-frame 44 is provided with upper arm support portions 64, 64 which support the upper arm 61 (FIG. 2). The sub-frame 60 is provided with lower arm support portions 65, 65 which support the lower arm 62 (FIG. 2) and with a shock absorber support portion 66 which supports the rear shock absorber 63 (FIG. 1). The upper arm 61, the lower arm 62 and the rear shock absorber constitute the rear suspension 59. These support portions support the constituent components of the rear suspension 59.

As shown in FIG. 1, a pair of left and right front frames 46, 46 are each provided between the upper pipe 41 and lower pipe 42 of the front portion of the vehicle body so as to extend from the vicinity of the front end of the upper pipe 41 to the rear of the vehicle body. The front frame 46 is provided with upper arm support portions 54, 54 which support the upper arm 51 (FIG. 2). The horizontal portion 42a of the lower pipe 42 is provided with lower arm support portions 55, 55 which support the lower arm 52 (FIG. 2). The front slant portion 41a of the upper pipe 41 is provided with shock absorber support portions 56, 56 which support the front shock absorber 53 (FIG. 1). The upper arm 51, the lower arm 52 and the front shock absorber 53 constitute the front suspension 50. These support portions support the constituent components of the front suspension. In this configuration, the shock absorber support portions 56, 56 are formed on the cross member 4f spanned between the front slant portions 41a, 41a of the upper pipes 41, 41.

The front frames 46, 46 each bend to form a bending portion 64a rearward of the upper arm support portion 46a, extending obliquely downward from the bending portion 64a, and are each joined to the horizontal portion 42a of the lower pipe 42. A pair of down tubes (also called the front upper frames) 47, 47 extending downward from the left and right upper pipes 41 are each connected to between the bending portion 46a of the front frame 46 and the upper pipe 41 (the front slant portion 41a). In addition, a pair of left and right front lower frames 48, 48 extending from the left and right lower pipes 42, 42, respectively, are each connected to between the bending portion 46a and the lower pipe 42. These components form a truss structure to increase frame rigidity around the front. The above-mentioned down tube 47 and the upper pipe 41 are joined together via a bracket 49 made of a generally triangular plate member so that the bracket 49 increases a joint area to increase the joint strength between the down tube 47 and the upper pipe 41.

A radiator grill 80 is attached to the pair of left and right down tubes 47, 47 mentioned above. The radiator grill 80 extends between the down tubes 47, 47 and steering shaft 27, and the radiator 25 to appropriately protect the front surface of the radiator 25. The radiator grill 80 is composed of a pair of left and right radiator grills 80R, 80L which are formed symmetrical. The radiator grills 80R and 80L shield right and left front surfaces, respectively, of the radiator 25.

Figure 3:
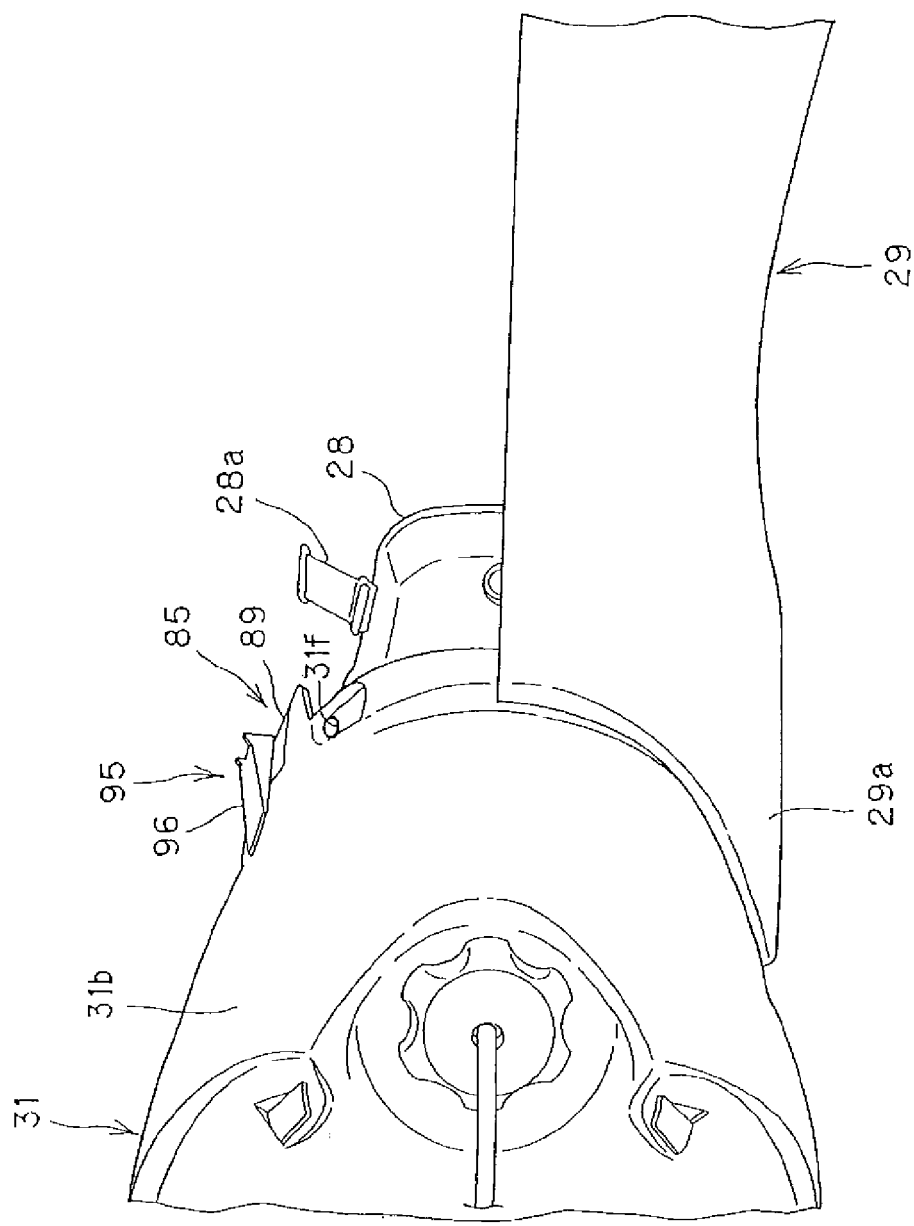
FIG. 3 is a plan view illustrating a tank cover along with the peripheral configuration thereof.
Figure 4:
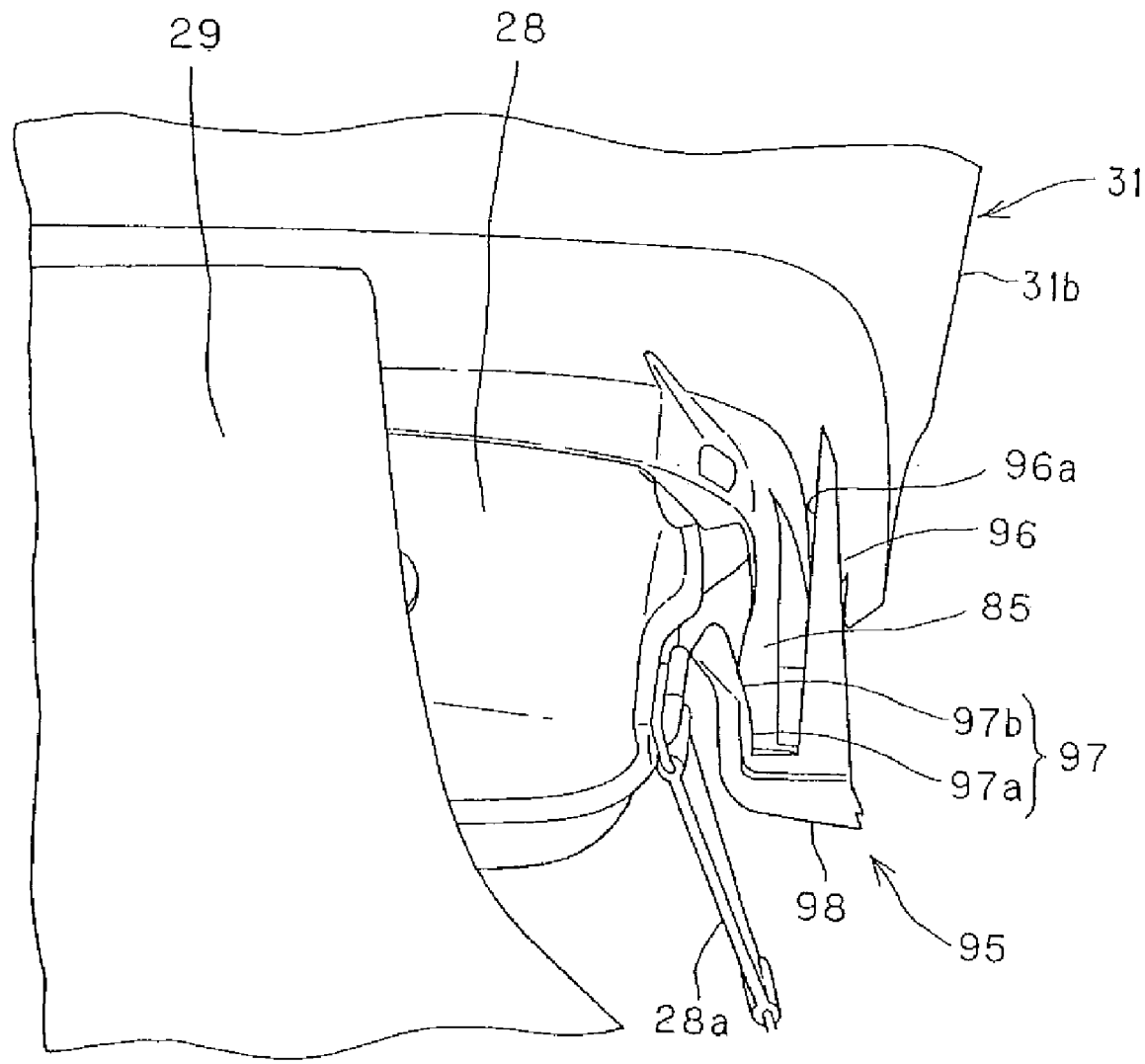
FIG. 4 illustrates the tank cover along with the peripheral portion thereof as viewed from the rear of a vehicle body.
Figure 5A:
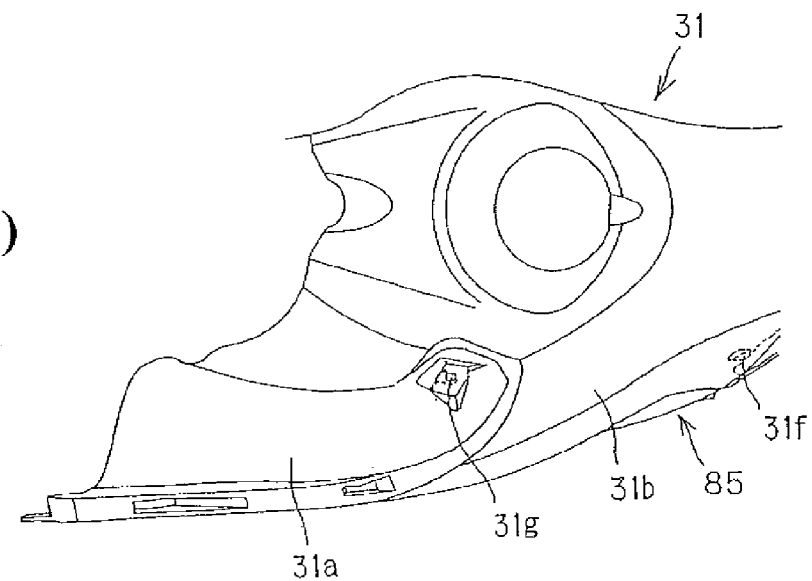
FIG. 5(a) is a plan view of the tank cover.
Figure 5B:
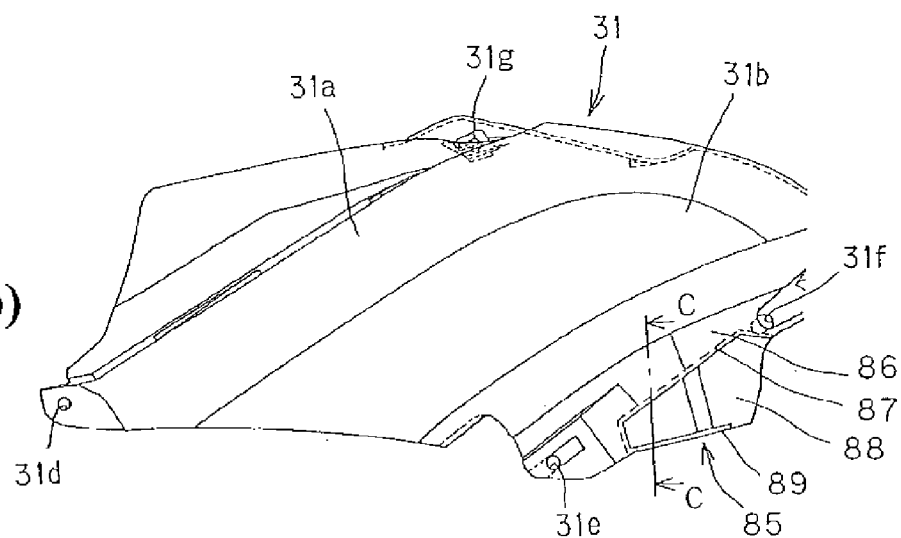
FIG. 5(b) is a lateral view of the tank cover.
Figure 5C:
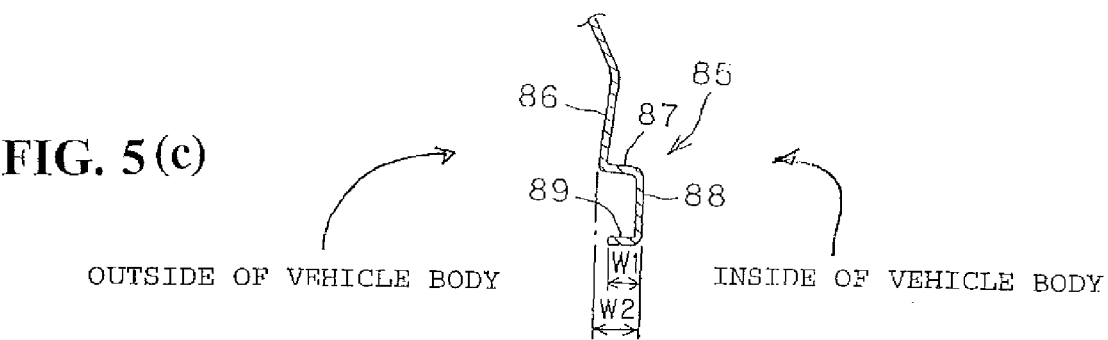
FIG. 5(c) is a cross-sectional view taken along line C-C of FIG. 5(b)

FIG. 3 is a plan view illustrating the tank cover 31 along with the peripheral configuration thereof. FIG. 4 illustrates the tank cover 31 and the peripheral configuration as viewed from the rear of the vehicle body. FIG. 5(a) is a plan view of the tank cover 31, FIG. 5(b) is a lateral view of the tank cover 31 and FIG. 5(c) is a cross-sectional view taken along line C-C of FIG. 5(b). As illustrated in FIG. 3, the right half portion of the seat 29 is omitted other than a fastening groove 95 described later.

Tank cover 31 has a generally bawl-like shape covering the fuel tank 28 from above and is integrally molded of a resin material or the like. As illustrated in FIG. 3, a band 28a is used to hold the fuel tank 28 to the vehicle body side.

The tank cover 31 is configured to include a front half portion 31a formed with left and right lateral edges which extend approximately horizontally and a rear half portion 31b which is contiguous with the rear of the front half portion 31a and is formed with left and lateral edges slanting rearward upwardly and obliquely. As shown in FIGS. 5(a) and 5(b), the tank cover 31 has left and right portions each formed with opening holes 31d, 31e, 31f and 31g at the lower portion of a front end, the lower portion of an intermediate portion, the lower portion of the rear portion and the upper portion of the rear portion, respectively. A plurality of mount bolts (not shown) are inserted from the outside into the corresponding opening holes 31d to 31g so that the tank cover 31 is fastened to the vehicle body side (the body frame 4, fuel tank 28, etc.)

As shown in FIG. 5(b), the rear half portion 31b of the tank cover 31 are integrally formed with a pair of left and right flanges 85, 85 which extend downward from the respective left and right toward the rear of the vehicle body. The flanges 85, 85 are formed symmetrically; therefore, one of them is detailed below.

The flange 85 functions a seat fastening portion adapted to fasten the seat 29 thereto. As shown in FIG. 5(c), the flange 85 extends downwardly from the tank cover 31 and is formed to bend like a generally U-shape in bending cross-section. This increases rigidity because its section modulus is made greater than that of a simple plate like shape.

More specifically, the flange 85 includes a slant plate section 86, an upper horizontal plate section 87, a vertical plate section 88, and a lower horizontal plate section 89. The slant plate section 86 extends downward at an angle slightly slanting from the tank cover 31 toward the outside of the vehicle body. The upper horizontal plate section 87 bends from the lower end of the slant plate section 86 toward the inside of the vehicle body and extends downward approximately vertically. The vertical plate section 88 bends downward from the end of the upper horizontal plate section 87 and extends downward approximately vertically. The lower horizontal plate section 89 bends from the lower end of the vertical plate section 88 toward the outside of the vehicle body and extends approximately horizontally. The width W1 of the lower horizontally plate section 89 is smaller than the width W2 of the upper horizontal plate section 87 (W1<W2).

As shown in FIG. 5(b), the lower horizontal plate section 89 slantly extends to the rear and upwardly at an angle close to the general horizontal as viewed from the side. In addition, as shown in FIG. 3, the lower horizontal plate section 89 is progressively reduced in width as it goes toward the rear of the vehicle body and smoothly merges at the rear end with the front surface of the vertical plate section 88.

As shown in FIG. 5(b), the upper horizontal plate section 87 slantly extends to the rear and upwardly at an acuter angle than that of the lower horizontal plate section. Thus, the upper horizontal plate section 87 and the lower horizontal plate section 89 are progressively spaced apart vertically from each other as they go rearward. In addition, the rear end of the flange 85 is shaped like an elongate plate that extends vertically of the vehicle body (see FIG. 3).

Figure 6:
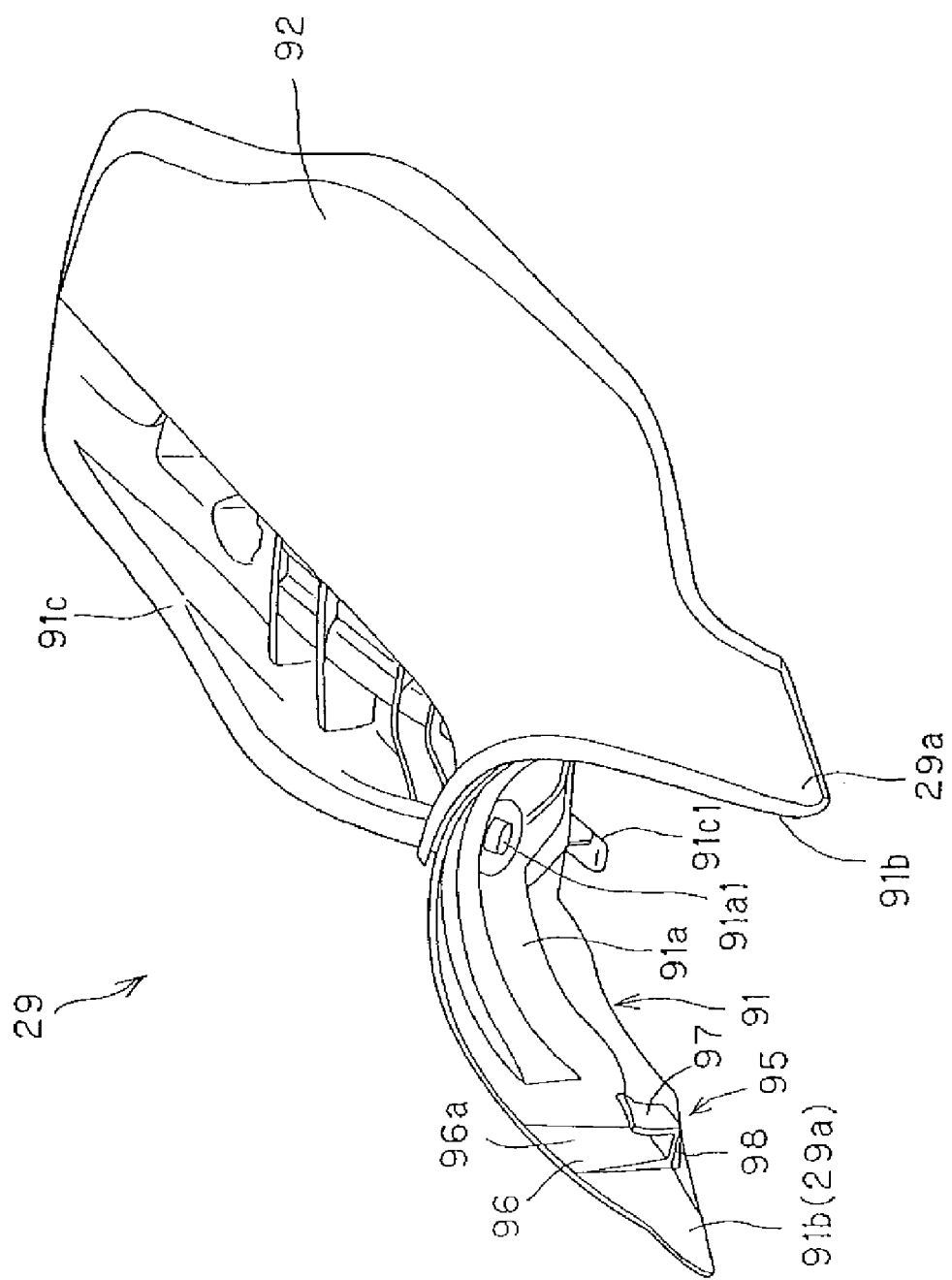
FIG. 6 is a perspective view of the seat.

The fastening grooves 95, 95 (see FIG. 4) provided on the seat 29 are fastened to the respective associated flanges 85. FIG. 6 is a perspective view of the seat 29, FIG. 7 is a cross-sectional view of the seat, and FIG. 8 illustrates the seat 29 as viewed from the rear side.

Figure 7:
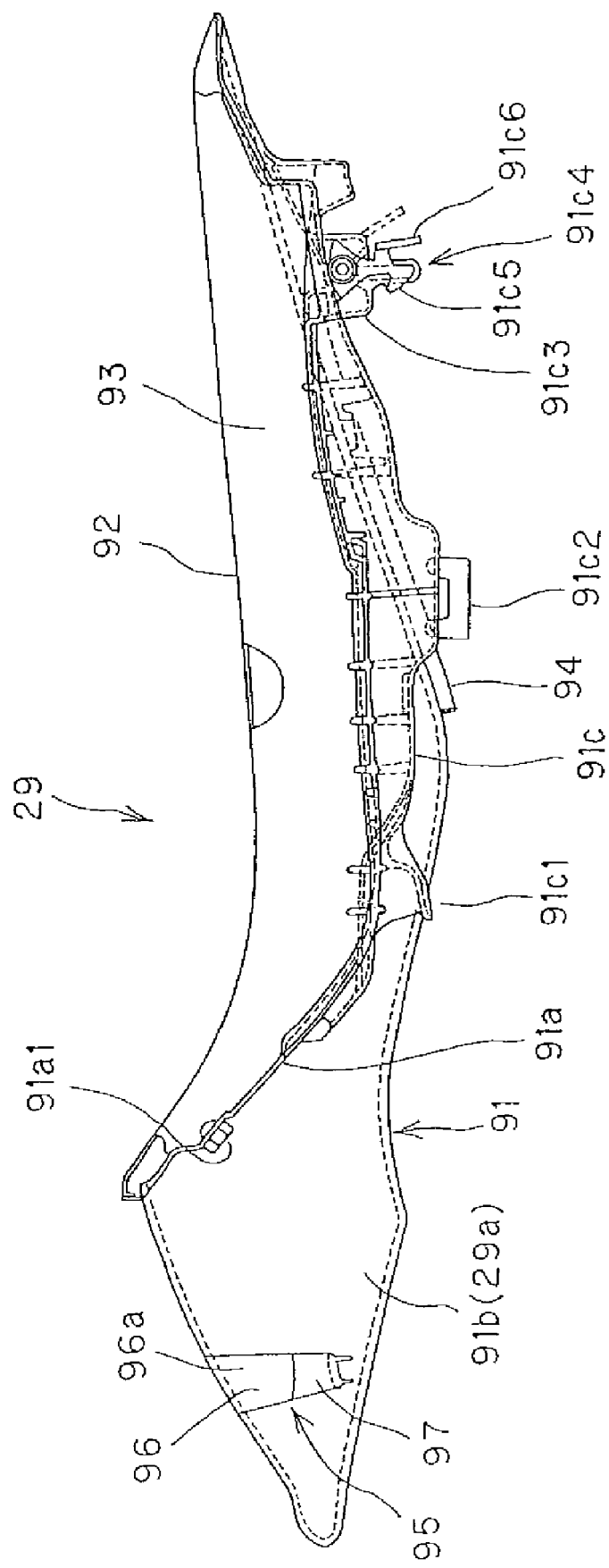
FIG. 7 is a cross-sectional view of the seat.
Figure 8:
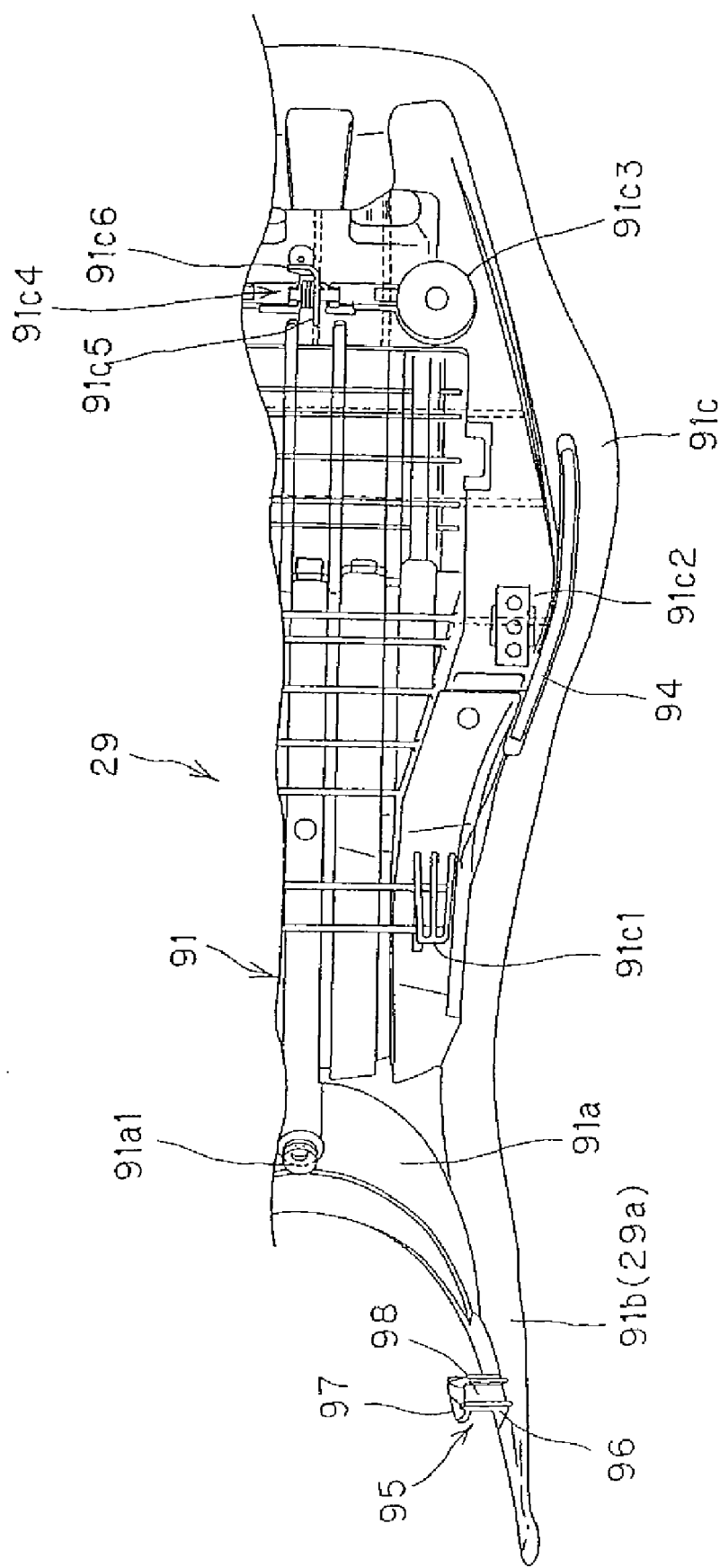
FIG. 8 is a rear view of the seat.

Referring to FIGS. 6 and 7, the seat 29 includes a seat bottom plate 91 functioning as a seat frame, a seat surface skin 92, and a shock absorber material 93 disposed between the seat surface skin 92 and the seat bottom plate 91. The seat 29 is bifurcated such that respective seat front ends 29a, 29a extend along the left and right sides the fuel tank 28.

The seat bottom plate 91 is integrally molded of a rigid material such as a resin material or the like and includes a front slant portion 91a, a pair of left and right front end portions 91b, 91b, and a rear extending portion 91c. The front slant portion 91a gently slants to the rear and downwardly along the tank cover 31. The left and right front end portions 91b, 91b extend from the left and right of the front slant portion 91a along the left and right lateral surfaces, respectively, of the tank cover 31. The rear extending portion 91c extends rearward from the rear end of the front slant portion 91a.

The front slant portion 91a is attached with a bush 91a1 made of an elastic material such as rubber or the like. The front slant portion 91a is abutted against the upper surface of the tank cover 31 via the bush 29, which prevents the unsteadiness of the seat 29.

Referring to FIGS. 7 and 8, the rear extending portion 91c includes a pair of left and right hooks 91c1, 91c1, a pair of left and right seat support rubbers 91c2, 91c2, a pair of left and right guide pins 91c3, 91c3, and a stopper mechanism 91c4. The hooks 91c1, 91c1 each extend forward from the front lower portion of the rear extending portion 91c and is engaged with rubber (not shown) provided on the sub-frame (FIG. 2). The seat support rubbers 91c2, 91c2 project downward from the generally intermediate portion thereof and are abutted against the cross member 4m (FIG. 2). The guide pins 91c3, 91c3 project downward from the rear portion thereof and are each inserted into a corresponding one of a pair of left and right mount rubbers provided on the cross member 4r (FIG. 2) spanned between the sub-frames 60, 60. FIGS. 7 and 8 illustrate one of the hooks 91c1, 91c1, of the seat support rubbers 91c2, 91c2, and of the guide pins 91c3, 91c3.

In the stopper mechanism 91c4, a stopper 91c5 turnably supported by the seat bottom plate 91 is locked by a lock mechanism by being biased by a biasing member not shown in a direction of being locked by the lock mechanism. In addition, the lock of the stopper 91c5 is released by manually operating a lever 91c6 extending from the stopper 91c5. In addition, in FIG. 8 a seal rubber 94 is adapted to seal the gap between the seat 94 and the vehicle body side.

The respective fastening grooves 95, 95 (FIGS. 6 through 8) are formed inside the pair of left and right front end portions 91b, 91b of the seat bottom plate 91. The fastening grooves 95, 95 function as tank cover fastening portions fastened respectively to the left and right flanges 85 of the tank cover 13. The fastening grooves 95, 95 are symmetrical, therefore, one of them is described below.

Figure 9A:
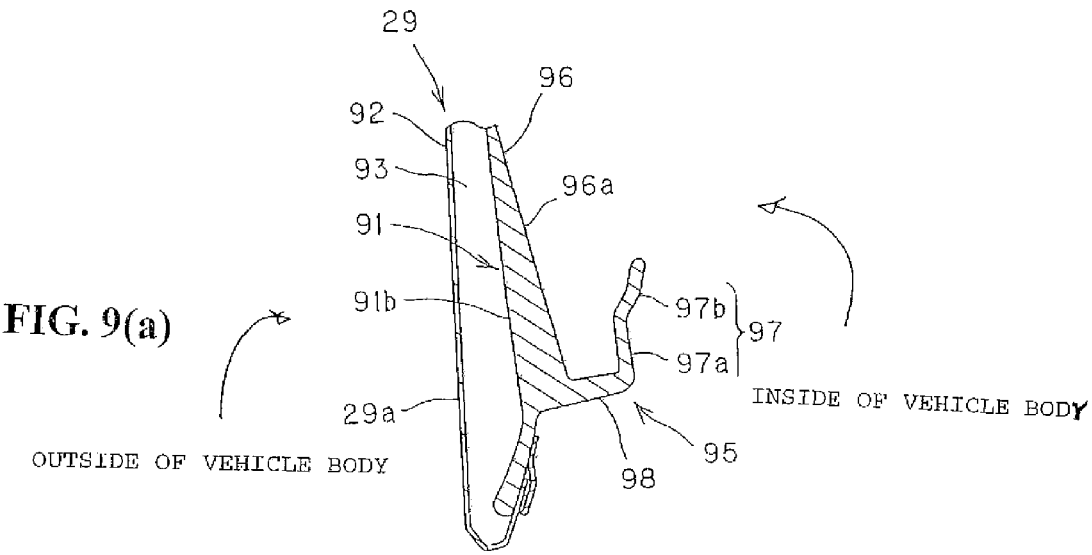
FIG. 9(a) is a cross-sectional view of a fastening groove and FIG. 9(b) illustrates the fastening state of the fastening groove and a flange.
Figure 9B:
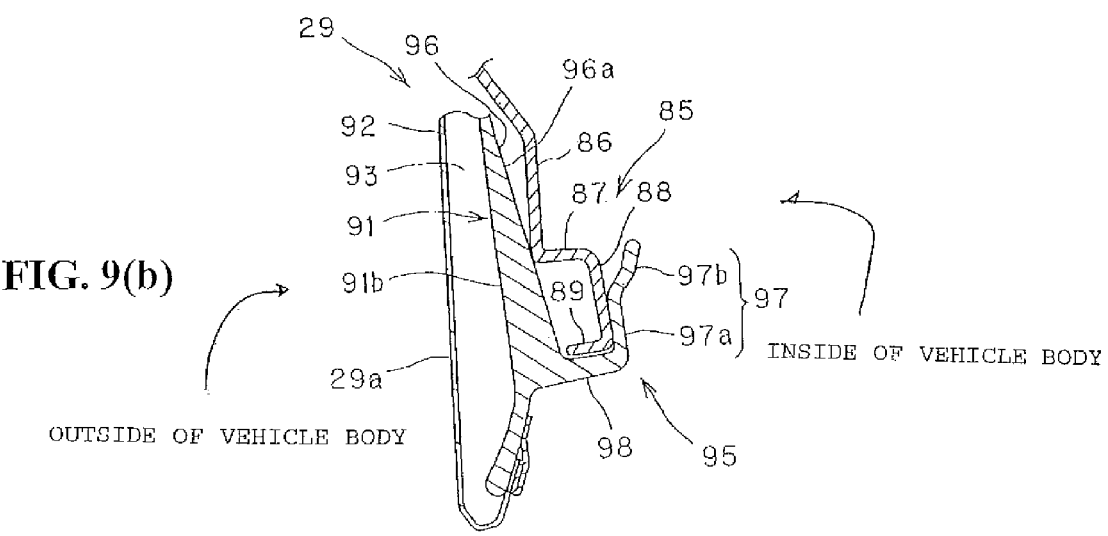

FIG. 9(a) is a cross-sectional view of the fastening groove 95. FIG. 9(b) illustrates the fastening groove 95 and flange 85 which are fastened to each other. Referring to FIG. 9(a), the fastening groove 95 is formed in a general U-shape opening upward to have a pair of left and right leg sections 96, 97 with a connecting section 98 which connects the lower ends of the leg sections 96, 97. Of the leg sections 96, 97, the leg section 96 on the external side of the vehicle body is joined to the inside surface of the seat front end 29a and a surface 96a on the internal side of the vehicle body is formed as a slant surface that gently slants outwardly of the vehicle body so as to face the upside.

The leg section 97 on the internal side of the vehicle body is formed shorter than the leg section 96 on the external side of the vehicle. In addition, the leg section 97 on the internal side of the vehicle body includes a base portion 97a extending approximately vertically toward the upside and a slant portion 97b which bends from the upper end of the base portion 97a, slanting inwardly of the vehicle body, and extends upward. In this way, the fastening groove 95 is formed so that the gap (groove interval) between the leg section 97 and leg section 96 thereof is progressively increased as it goes upward.

In the case of mounting a seat on a vehicle of this type, the seat is mounted while moved above the body frame and forward of the vehicle body. In this case, it is easy for a worker who mounts the seat to allow the anteroposterior centerline of the seat to visually coincide with that of the vehicle body and in this state to move the seat forward of the vehicle body. However, in related art it has been difficult to allow the fastening portion of the seat to coincide with the position of the seat fastening portion.

The present embodiment is the same as the existing technique in that a worker allows the anteroposterior centerline of the seat 29 to approximately coincide with that of the vehicle body and moves the seat 29 forward of the vehicle body. However, in the present embodiment, the fastening groove 95 which is the fastening portion of the seat 29 has the general U-shape opening upward and the seat fastening portion on the vehicle body side is the flange 85 provided on the tank cover 31. Thus, when the seat 29 is moved forward of the vehicle body, the flange 85 can be guided into the fastening groove 95.

More specifically, the leg section 96 of the fastening groove 95 on the external side of the vehicle body extends upward from the leg section 97 on the internal side of the vehicle body. Thus, the flange 85 is guided inside the leg section 96 on the external side of the vehicle body. In addition, the leg section 97 on the internal side of the vehicle body is slanted relative to the flange 85 so as to enter the internal side of the vehicle body. Thus, the flange 85 can smoothly be guided into the fastening groove 95.

In this case, as sown in FIG. 3 the lower horizontal plate section 89 of the flange 85 is progressively reduced in width as it goes toward the rear of the vehicle body and as shown in FIG. 5 extends at such an angle as to slant to the rear and upwardly. Thus, the flange 85 is more easily guided into the fastening groove 95. If the seat 29 is further moved forwardly, the lower edge (the lower horizontal plate section 89) of the flange 85 comes into abutment against the connecting portion 98 connecting the lower portion of the fastening groove 95. The fastening groove 95 moves downward along the lower edge of the flange 85 so that the seat 29 can be guided to an appropriate support position while the seat front end 29a is prevented from floating up.

The upper horizontal plate portion 87 of the flange 85 is slanted at such an acute angle as to extend to the rear and upwardly as viewed from the side. Thus, the upper horizontal plate portion 87 enters the fastening groove 95 (see FIG. 9(b)) so that the flange 85 is gripped from either side thereof by the fastening groove 95. This restricts the leftward or rightward movement of the seat front end 29a and brings the lower edge (the lower horizontal plate portion 89) of the flange 85 into abutment against the fastening groove 95, which prevents the seat front edge 29a from floating up.

In this way, when the seat 29 is moved forward, the flange 85 is gripped by the fastening groove 95 and the pair of left and right hooks 91c1, 91c1 of the seat 29 are retained by the vehicle body side to restrict the further forward movement. The stopper mechanism 91c4 (FIG. 7) of the rear portion of the seat 29 is locked by the vehicle body side lock mechanism to thereby secure the entire seat 29 to the vehicle body side.

In the present embodiment, the tank cover 31 is provided with the flange 85 extending toward the rearward of the vehicle body and the seat 29 is provided with the fastening groove 95 opening upward to fasten the flange 85. When the seat 29 is moved forward, the flange 85 can be gripped by being guided from the opening into the fastening groove 95. Thus, the fastening groove 95 can restrict the leftward and rightward movement of the seat front end 29a and the attachment of the seat 29 can be facilitated.

In the present configuration, the leg section 97 of the fastening groove 95 on the internal side of the vehicle body is slanted relative to the flange 85 to enter the internal side of the vehicle body. Thus, this slant can smoothly guide the flange 85 into the fastening groove 95, thereby facilitating the attachment of the seat 29.

In the present configuration, since the fastening grooves 95 are provided on the inside of the seat front end 29a extending from side to side, the attachment of the seat 29 can be facilitated with the fastening grooves 95 not exposed to the external appearance of the vehicle body. The fastening groove 95 can integrally be provided on the seat bottom plate 91, that is, molded with the seat bottom plate 91. If the fastening groove 95 is separately provided on the seat bottom plate 91, it can easily be attached to the seat 29.

When the gear ratio of the transmission in the AVT vehicle 1 described above is changed, the gear shift pedal 11 provided at the leftward center of the vehicle body is operated in FIG. 2 to shift the gear ratio to one of the first through fifth speed-stages and the reverse stage. If the gear ratio is changed to the reverse stage, in FIG. 1a reverse assist lever 15 provided below the handlebar 30 in the front portion of the vehicle body is operated and in this state the shift pedal 11 is operated to shift the gear ratio to the reverse stage.

Figure 10:
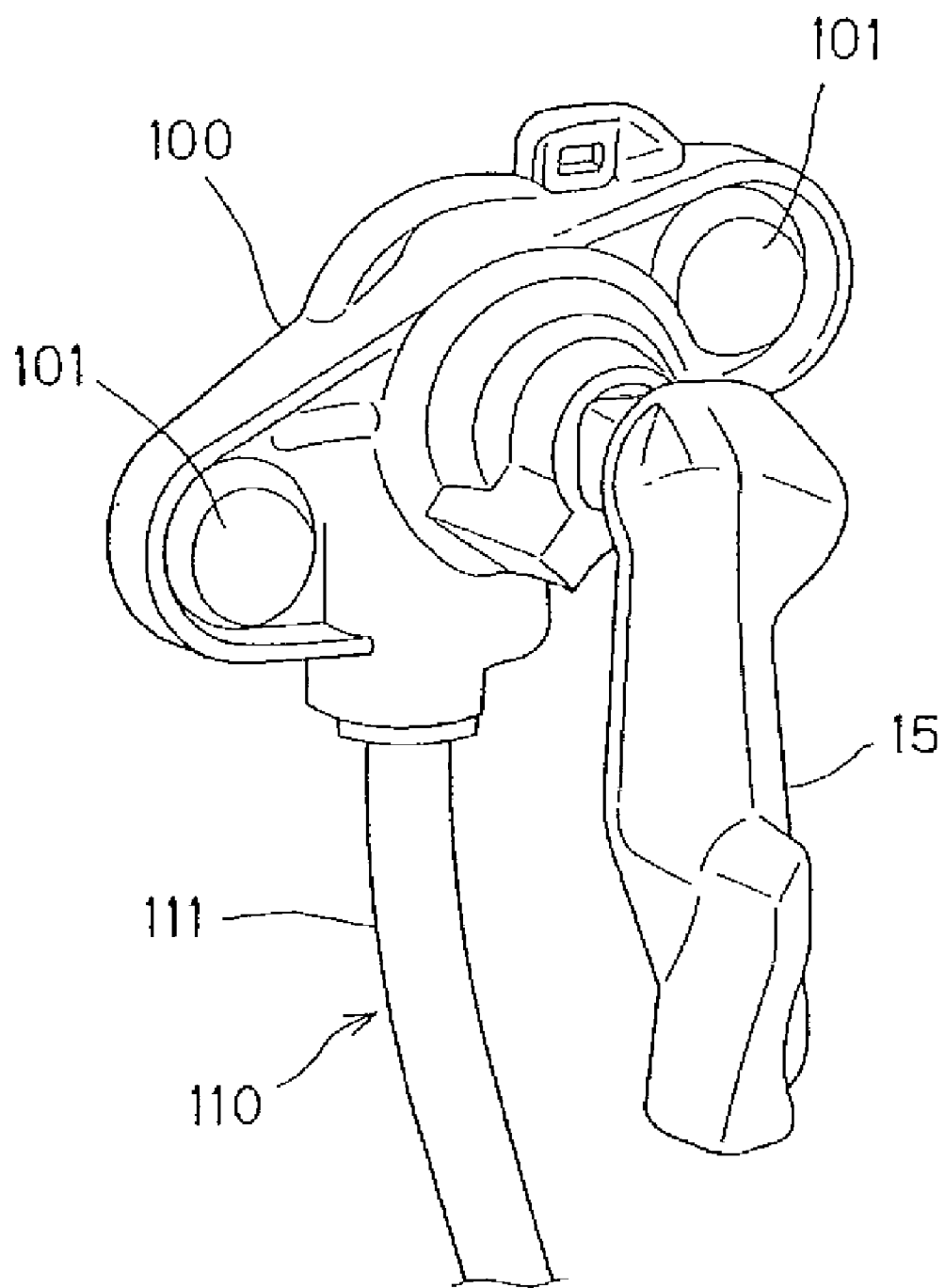
FIG. 10 illustrates a reverse assist lever together with a lever support mechanism.
Figure 11:
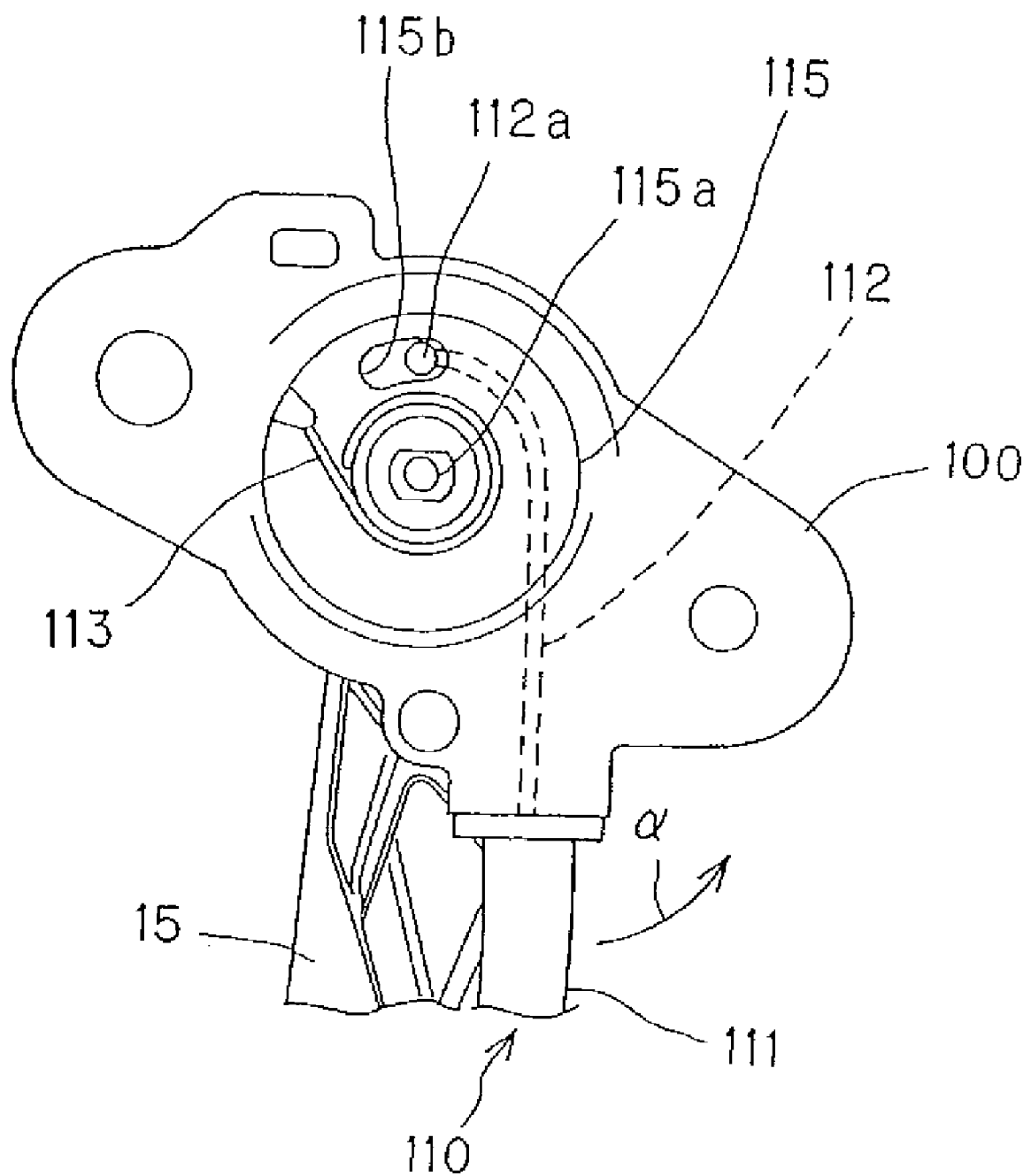
FIG. 11 illustrates an internal structure of the lever support mechanism.

FIG. 10 illustrates the reverse assist lever 15 together with a lever support mechanism 100 and FIG. 11 illustrates an internal structure of the lever support mechanism 100.

Referring to FIG. 10, the lever support mechanism 100 is attached to the body frame 4 with a pair of left and right screws 101, 101 to turnably and sideways support the reverse assist lever (hereinafter called the lever) 15 and is coupled with one end of a wire 110 for releasing reverse lock. Referring to FIG. 11, the wire 110 is composed of an outer tube 111 and an inner wire 112 passing through the inside of the outer tube 111. The lever support mechanism 100 internally includes a mechanism adapted to wind up the inner wire 112 in response to the turning of the lever 15 and a biasing spring 113 adapted to bias the lever 15 toward the position of a reverse lock state (hereinafter, called the reverse lock position, the "six o'clock" position in a clockwise direction in this embodiment).

More specifically, as shown in FIG. 11, a wire drum 115 with a relatively large diameter is turnably supported by the lever support mechanism 100. A central shaft 115a of the wire drum 115 is coupled to one end of the lever 15 so that the lever 15 and the wire drum 115 are configured to be integrally turnable. The wire drum 115 is formed with an elongate groove 115b extending along the circumferential direction thereof. The inner wire 112 is connected at one end to the wire drum 115 by the elongate groove 115b holding a stub or stopper (the tubular clamp) 112a provided at the one end of the inner wire 112. As described above, the stub 112a is held by the elongate groove 115b so as to have play, so that it is movable in the circumferential direction of the wire drum 115. Thus, if the inner wire 112 causes expansion, the stub 112a is moved in the elongate groove 115b according to the expansion to thereby suppress the sag of the inner wire 112.

With the configuration as above, when the wire drum 115 is operated in an operating direction (an α-direction in the figure) via the lever 15, specifically, when the lever 15 is operatively pulled up by an occupant (operator), the inner wire 112 is wound around the wire drum 115. Thereafter, if the lever 15 is released, the wire drum 115 is turned in the reverse direction by the biasing spring 113 and automatically returned to the reverse lock position and the inner wire 112 is unwound.

Figure 12:
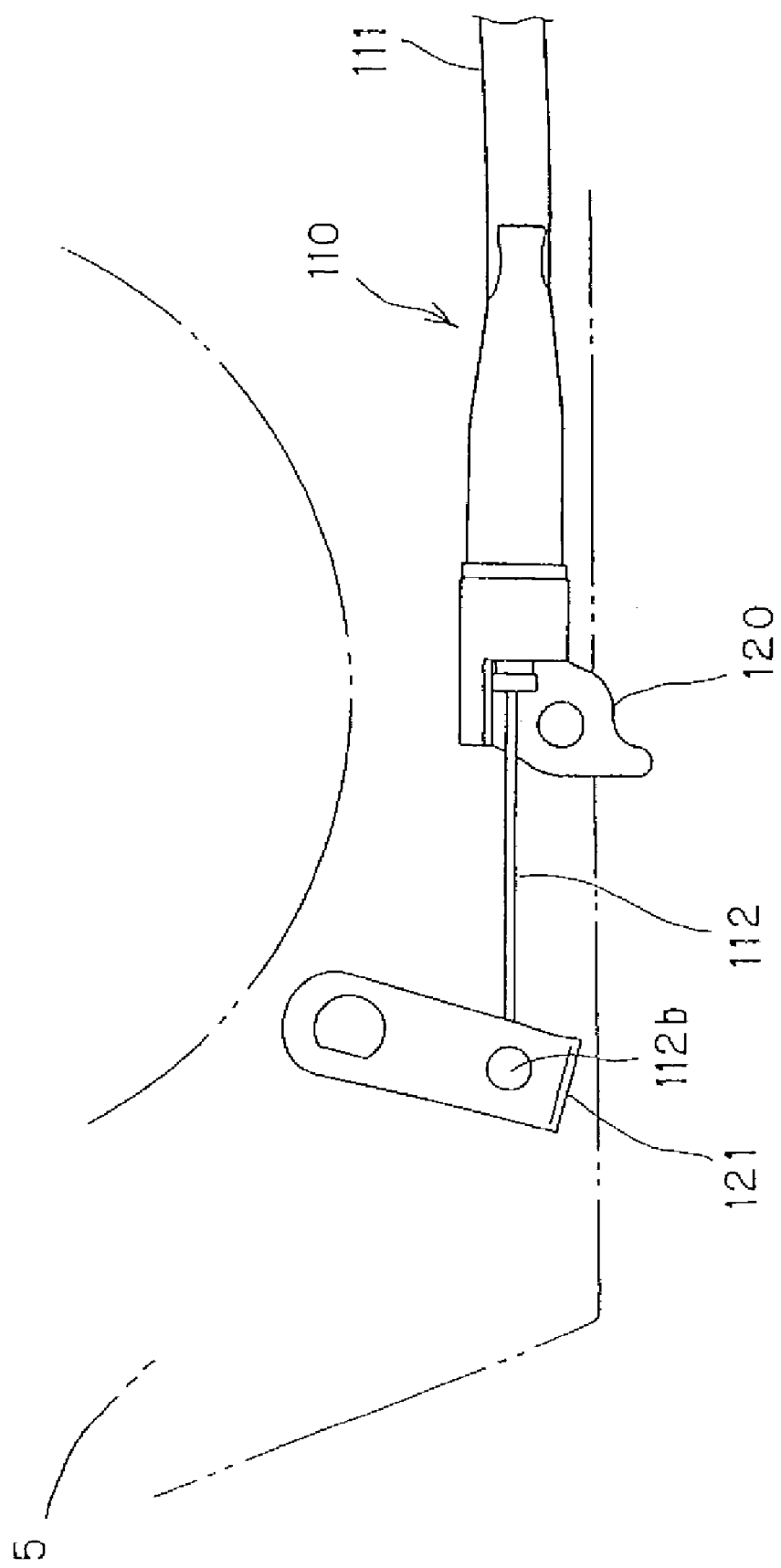
FIG. 12 illustrates the other end of a wire extending from the lever support mechanism along with the peripheral structure.

As shown in FIG. 1, the wire 110 is extended to the lower portion of the vehicle body from the lever support mechanism 100, then to the rear portion thereof. In addition, as shown in FIG. 12, the outer tube 111 is supported at one end by the lateral portion of the engine 5 via a bracket 120.

The inner wire 112 pulled out from one end of the outer tube 111 is connected via a stub or stopper 112b to one end of the reverse lock releasing mechanism 121 turnably (swingably) provided on the lateral portion of the engine 5. The reverse lock releasing member 121 shown in FIG. 12 is located to correspond to the reverse lock position. If the reverse lock releasing member 121 is turned toward the front of the vehicle body by the inner wire 112, the reverse lock is released.

In general, if the reverse lock is released via the wire, an adjustment mechanism is needed to adjust the amount of play of the wire. In contrast, the present configuration eliminates the adjustment mechanism by ensuring the excess amount of wound wire by enlarging the diameter of the wire drum 115.

More specifically, in the present configuration, the operation amount (operation angle) of the lever 15 required to release the reverse lock is set to an appropriate operation amount (e.g. about 45 degrees) at which the operator can easily operate the lever. The wire drum 115 is increased in diameter to have an amount of winding taking into account the expansion of the inner wire 112 encountered when the lever 15 is operated at such an appropriate operation amount. In this case, the amount of winding taking into account the expansion of the inner wire includes the winding amount containing the installation error of the wire as well as the expansion resulting from the long-term use of the wire.

In the present configuration, the sideways lever 15 is connected at one end to the central shaft 115*a* of the wire drum 115 and pulled up. Therefore, the lever can easily be formed long so as to provide an appropriate operation force easy to be operated. A situation can be avoidable in which the operation of the lever becomes heavy because the lever is short in length.

In short, the present configuration can eliminate the adjustment mechanism to reduce the number of component parts while making the balance between the operation amount and the operation force appropriate to ensure operability.

In the AVT vehicle 1 described above, as shown in FIG. 13, a tank under cover 200 is disposed on the intermediate portions 41*b*, 41*b* (see FIG. 1) of the upper pipes 41, 41 so as to straddle between the intermediate portions 41*b*, 41*b*. A seat under cover 210 is disposed on the horizontally extending portions 60*a*, 60*a* of the sub-frames 60, 60. The tank under cover 200 is integrally molded of resin or the like and is a cover that is disposed under the fuel tank 28 to shadow heat transmitted from the engine 5 to the fuel tank 28. The seat under cover 210 is formed of a vibration absorbing material such as rubber or the like and a cover that shadows heat or blocks vibration transmitted to the seat 29 or that prevents mud or the like from adhering to the back of the seat 29.

Figure 13:
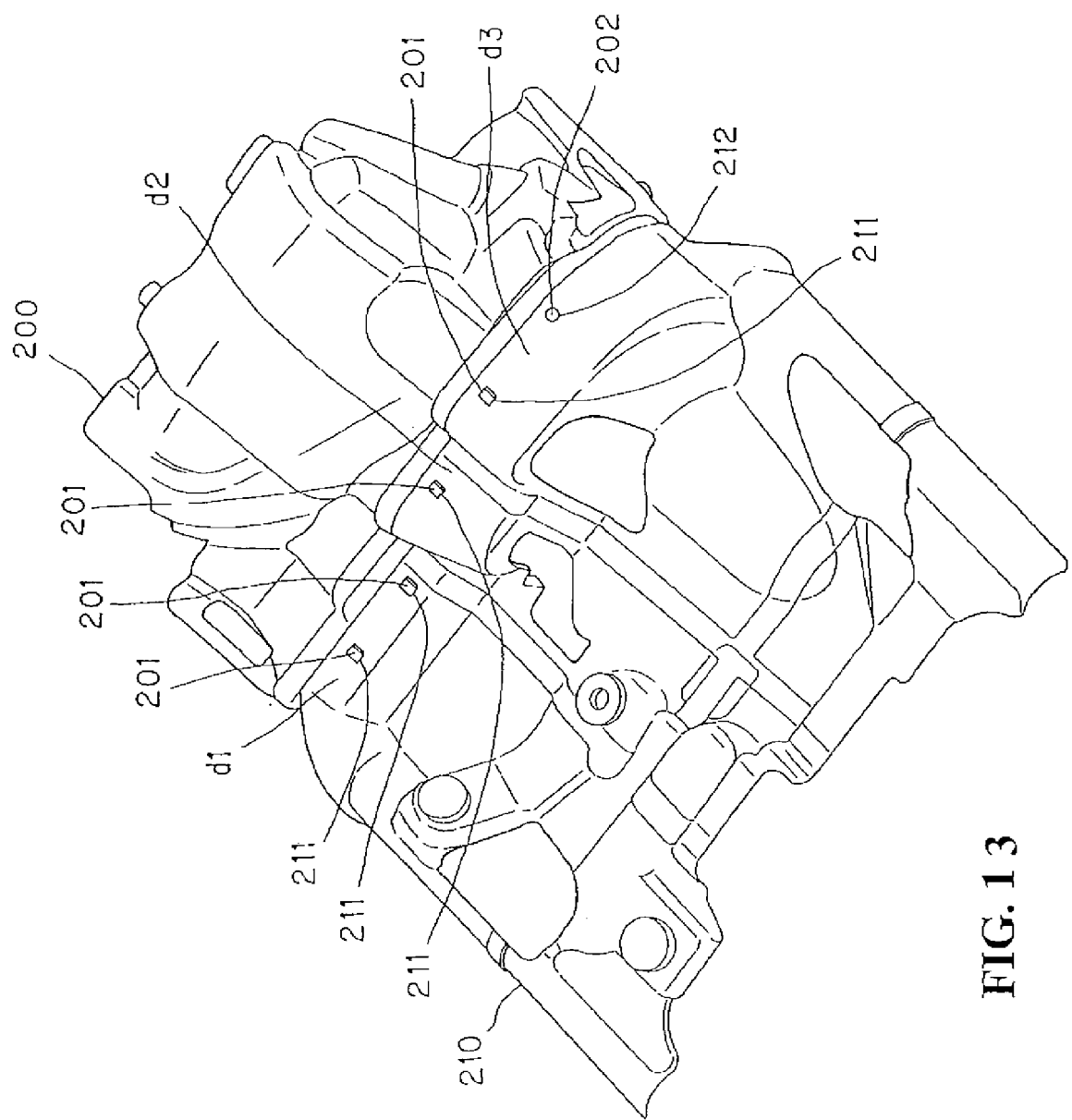
FIG. 13 illustrates a tank under cover and a seat under cover.

As shown in FIG. 13, the vehicle body front side edge portion of the seat under cover 210 overlaps from above the vehicle body rear side edge portion of the tank under cover 200. In this case, a plurality of (four in the embodiment) claw portions 201 formed to be spaced apart from each other along the edge portion of the tank under cover 200 are each engaged with and joined to a corresponding one of a plurality of hole portions 211 formed to be spaced apart from each other along the edge portion of the seat under cover 210. A projection 202 is formed cylindrical along the alignment direction of the claw portions 201 and is fitted into a circular hole 212 formed in the seat under cover 210 to position the connecting position between the tank under cover 200 and the seat under cover 210.

Figure 14A:
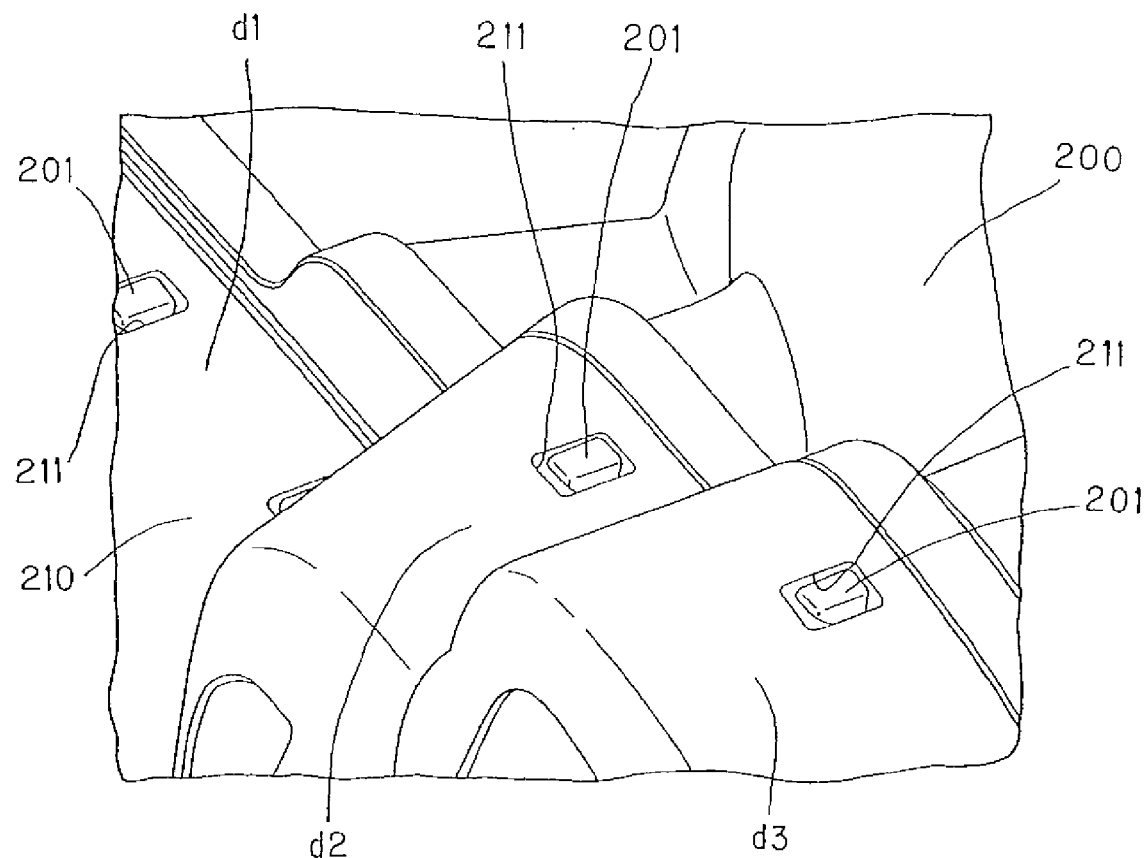
FIG. 14(a) illustrates the connecting portion between the tank under cover and the seat under cover.
Figure 14B:
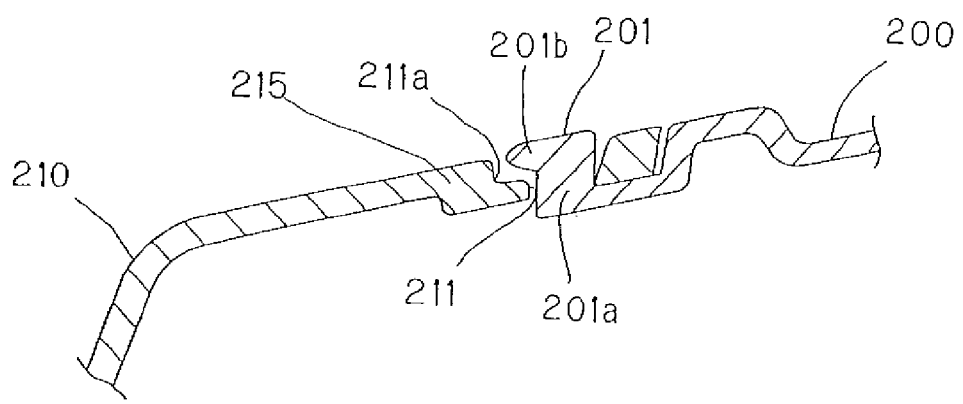
FIG. 14(b) is a lateral cross-sectional view of the connecting portion.

FIG. 14(*a*) is a perspective view illustrating a joint portion between the tank under cover 200 and the seat under cover 210. FIG. 14(*b*) is a lateral cross-sectional view of the joint portion. As shown in FIGS. 13 and 14(*a*), the tank under cover 200 and the seat under cover 210 are each formed to have convex and concave shapes conforming to component parts above and below the covers 200, 210. Thus, stepped portions d1, d2, d3 are formed also on the edge portions of the covers so as to have a plurality of the claw portions 201 and hole portions 211 allocated thereto. Referring to FIG. 14(*b*), the claw portion 201 of the tank under cover 200 is formed in a generally L-shape in cross-section which has a thick base section 201*a* and an end section 201*b* located above the base section 201*a* and projecting toward the rear of the vehicle body. The hole portion 211 of the seat under cover 210 is formed at a thick section 215 thereof and has a stepped portion 211*a* to be engaged with the end section 201*b* of the claw portion 201.

When the tank under cover 200 and the seat under cover 210 are joined together, the seat under cover 210 is pressed to the tank under cover 200 so that each of the claw portions 201 may enter a corresponding one of the hole portions 211. The hole portion 211 of the seat under cover 210 is pressed and widened by the claw portion 201 to receive it. Consequently, the claw portion 210 engages the stepped portion 211*a* of the hole portion 211. On the other hand, when these covers 200, 210 are removed from each other, the seat under cover 210 is lifted while being pulled toward the rearward of the vehicle body. The hole portion 211 of the seat under cover 210 is widened so that the claw portion 201 can easily be pulled out from the hole portion 211.

As described above, the claw potion 201 of the tank under cover 200 is formed thick in a generally L-shape in cross section to have the end portion 201*b* projecting toward the rear of the vehicle body, which is engaged with the hole portion 211 of the seat under cover 210. With this configuration, the claw portion 201 can be increased in rigidity than that formed like a thin plate. This can make it hard to break the claw portion 201 when the covers 200, 201 are attached to or removed from each other. The claw portion 201 is received in the hole portion 211 so as not to outwardly protrude when the covers 200, 210 are joined together. Therefore, the upper surface of the joint portion is flat, that is, the claw portion 201 does not interfere with other members. The seat under cover 210 is provided at the edge portion with the thick-section 215 thicker than the others and formed with the hole portion 211. Thus, the hole portion 211 can be formed with the stepped portion 211*a* to facilitate the joint with the claw portion 201.

The present invention has been described thus far on the basis of the embodiment. It is obvious, however, that the present invention is not limited to this embodiment. For example, in the embodiment described above, the fastening groove 95 which is the fastening portion of the seat 29 is formed as a generally U-shaped one. However, the shape of the entire fastening groove 95 is not limited to the general U-shape and a fastening groove that opens upward can widely be applicable. In addition, in the embodiment described above, the present invention is applied to the saddle-ride type four-wheeled vehicle. However, the invention is not limited to such a vehicle and can widely be applied to the seat support structure for vehicle of various types such as saddle-ride type three-wheeled vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat support structure for a vehicle comprising:
    a tank cover for covering a fuel tank, said tank cover being provided at its rear portion
    with flanges which extend toward the rear of the vehicle, at the lateral edge portions of the tank cover and on both sides of the vehicle, said flanges have a substantially U-shaped configuration which open laterally toward the sides of the vehicle, and a seat located rearward of the fuel tank and adapted to be fastened to the tank cover, said seat being provided with laterally disposed fastening grooves on both sides thereof which open upwards with a substantially U-shaped configuration for receiving and engaging said flanges whereby mounting of the seat and restricting the movement of the seat is facilitated.

2. The seat support structure according to claim 1, wherein the fastening grooves are provided inside a seat front end which extend to a left side and a right side.

3. The seat support structure according to claim 1, wherein a leg of the fastening grooves on an internal side of the vehicle body are slanted to enter toward the internal side of the vehicle body with respect to the flange of the seat fastening portion.

4. The seat support structure according to claim 2, wherein a leg of the fastening grooves on an internal side of the vehicle body are slanted to enter toward the internal side of the vehicle body with respect to the flange of the seat fastening portion.

5. The seat support structure according to claim 1, and further including apertures formed in the cover for fastening the cover to the vehicle body.

6. The seat support structure according to claim 1, wherein the flanges are bent in a generally U-shape in cross-section and include a lower width section that is smaller relative to an upper width section.

7. The seat support structure of claim 1, wherein a leg of the fastening grooves on an internal side of the vehicle body is slanted toward the internal side of the vehicle body with respect to the flange of the tank cover whereby the flange is smoothly guided into the fastening groove, thereby facilitating the mounting of the seat.

8. The seat support structure of claim 1, wherein said flange has a lower width section which is smaller relative to an upper width section, and is progressively reduced in width toward the rear of the vehicle body.

9. The seat support structure of claim 8, wherein the upper width section and the lower width section are progressively spaced apart vertically from each other as they extend rearward.

10. The seat support structure of claim 1, wherein the flange is configured to be progressively reduced in width as it extends toward the rear of the vehicle body and at an angle so as to slant to the rear and upwardly, whereby the flange is gripped by the fastening groove.

11. The seat support structure of claim 10, wherein left and right hooks on the seat are retained by the vehicle body side to restrict further forward movement and a stopper mechanism of the rear portion of the seat is locked by a vehicle body side lock mechanism to secure the seat to the vehicle body side.

* * * * *